March 31, 1959    M. A. MOSKOVITZ    2,880,026
RESILIENT COUPLING MEANS
Filed Feb. 6, 1956
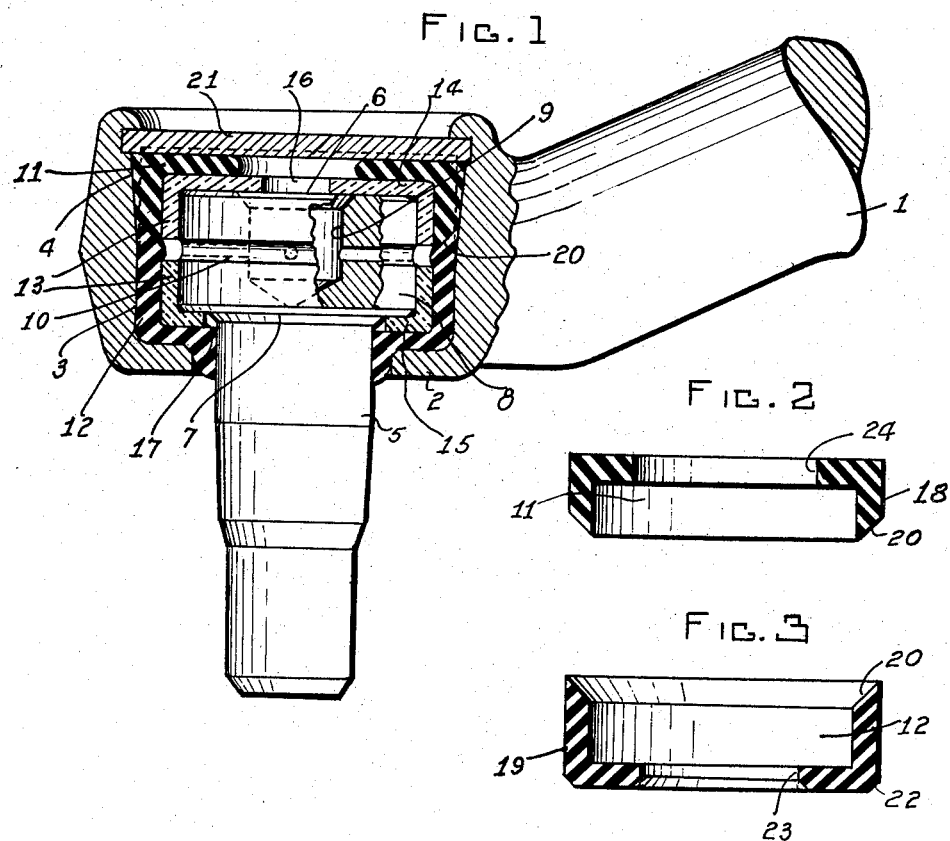
INVENTOR.
MILTON A. MOSKOVITZ
BY
ATTORNEY

United States Patent Office 2,880,026
Patented Mar. 31, 1959

2,880,026

RESILIENT COUPLING MEANS

Milton A. Moskovitz, Richmond Heights, Mo., assignor of one-half to Harry Frankel, St. Louis, Mo.

Application February 6, 1956, Serial No. 563,634

9 Claims. (Cl. 287—85)

This invention relates to joints generally, but more specifically to the kind of joints used in interconnecting cooperating members of the steering mechanism linkage of motor vehicles that have independently sprung wheels. The center or transverse link of such a linkage is for transmitting motion to the front wheels during steering, and the link moves in a generally reciprocatory path that is approximately parallel to the front end of the vehicle and has but a slight arcuate movement. The stud elements of such center links travel through but a slight degree of angularity or tilt to either side of their centered or normal position, say about eight degrees of tilt in either direction.

However, there may be considerable rotational movement of the stud, it is necessary to design such a joint that its parts will be held in proper operational fit without looseness or "mushiness" of steering, and at the same time permit of sufficient angular tilt of the stud to allow for misalignment or other error of installation of the pitman arm or idler arm between which the center link is connected.

One of the principal objects of this invention is to so construct such a joint that a minimum turning effort or torque is required for steering, and insure that the wheels return to their normal centered position after the vehicle has completed its turning.

Another object of my invention is to so construct a joint of the kind described, so that little or no lubricant need be added to the joint parts after assembly of the same.

A further object of the invention is to so construct such a device that it will include a member having a socket through which a stud extends and is rotatable and tiltable therein, with a resilient cushion means within the socket for maintaining the stud properly positioned and to retrieve it after tilt thereof, and with a liner of much lower frictional characteristic than said cushion material fitted between the latter and the stud head to permit ready and easy rotation of the stud.

An added object of my invention is to so construct a joint as described, wherein the cushion will be held under greater loading at one portion than at another, so as to permit one part of the stud to more readily tilt than another part of the latter.

Many other objects and advantages of the construction herein shown and described will be obvious to those skilled in the art to which this invention appertains, as will be more clearly pointed out in the following disclosure.

To this end, my invention consists in the novel construction, arrangement and combination of parts herein shown and described, and the uses mentioned, as will be more clearly apparent from the claims hereunto appended.

In the drawings, wherein like reference characters represent like or corresponding parts throughout the views, Figure 1 is a fragmentary view of a link, showing the joint in cross-section;

Figure 2 is a cross-sectional view of one of the pair of cushion elements; and

Figure 3 is a similar view of the other cushion element.

Referring more particularly to the drawings, wherein I have illustrated a preferred embodiment of my invention, 1 indicates one end of the center link used in a so-called parallelogram steering linkage of a vehicle.

This center link has an eye or bore extending transversely through each end, each eye providing a housing or socket that has a radially inwardly directed flange 2 at one end, as for example at the lower end in the drawing, thereby providing a smaller opening across said lower end than across the top of the opening.

It is to be further noted that the peripherally bounding or enclosing wall of the socket thus formed is cylindrical at its lower portion 3 for a predetermined distance upwardly of the socket, and is thence enlargingly flared outwardly or tapered at 4 to the upper or large end of the bore, for a purpose to be hereinafter explained.

A stud is intended for interconnection with either the pitman arm or idler arm, rotatable and only slightly tiltable relatively to the arm, this tilt being of the nature of only about eight degrees of arc to either side of the centered position of the stud, said stud having a shank portion 5 and with a radially enlarged approximately cylindrical head having the substantially parallel planar end faces 6 and 7, and with the annular circumferential bounding surface 8 between said end faces. This head is arranged to lie within the socket, while the shank projects axially outwardly therethrough.

A lubricant reservoir 9 may be formed in said head, opening thereinto from the end face 6 and thence communicating with ducts or passages that discharge radially outwardly into an annular groove 10 that peripherally encircles said stud head intermediate said end faces.

Although the stud movement is principally rotational relatively of the socket, yet there may be a slight degree of stud tilt that must be taken into consideration to insure proper operation of the joint, and therefore means are interposed between the socket and stud to tend to normally maintain the stud centered but which will retrieve the latter after tilt thereof.

Such means may comprise a pair of opposed cushioning elements 11 and 12 as shown in initial form in Figs. 2 and 3, and in operative or compressed position in Fig. 1, these elements being made of a material that is yieldably resilient and compressible, as of rubber or the like, and intermediate said means and the stud head there is arranged a substantially incompressible or only slightly compressible liner having a very much lower frictional characteristic than that of said cushioning elements, as for instance being made of nylon or nylon surfaced material, of properly hardened steel, bronze, etc.

This liner may comprise a pair of similarly shaped elements each having an annular bounding flange or rim 13, there being a radially inwardly directed flange 14 extending from an end of one of said pair of elements, and the other liner element having a similar flange 15, said flanges having central openings 16 and 17 respectively therethrough, the opening 16 being substantially in axial registry with the opening inlet into the lubricant reservoir, while the opening 17 is sufficiently larger to receive the stud shank therethrough. It is to be noted that the inner surfaces of the liner ends and the annular flanges rotatably receive and bear against the opposed end and peripheral surfaces of the stud head.

Said cushioning means are approximately cup-shaped, and the annular flanges 18 and 19 of the elements 11 and 12 respectively are of approximately the same internal and external diameters so that the elements are of substantially the same thickness. It may be mentioned here that said external diameters are substantially the same as that of the cylindrical bore portion of the socket. The internal diameters of the elements 11 and 12 are initially sufficiently smaller than the external peripheral diameters of the liner elements, say about .030″ smaller, so the cushioning elements must be stretched somewhat to enlarge them to receive and fit onto the liner elements, to thereby tightly grip the latter and act as a rotational unit therewith.

The opposed ends of said cushioning elements are complementally beveled as at 20—20, so that when said elements are in registry and pressed together, as shown in Fig. 1, said beveled edges will nest and fit together snugly to thereby form a seal against the escape of lubricant therepast. The overall depth of the pair of cushioning elements is sufficiently greater than the axial depth of the combined bore portions 3 and 4, so that the upper end of the element 11 initially projects slightly outwardly beyond the upper end of the tapered portion of the bore (as shown in dotted lines in Fig. 1), but after assembly of the joint the cushioning elements assume the position shown in full lines in said figure.

A closure or cover 21 is secured in place across the larger or upper end of the socket to maintain the parts in their intended assembled relationship, and it is obvious that the cushioning elements are held yieldably compressed, not only between the cover and the ends of the liner elements, but such compression causes the rubber to flow or spread radially to fill the annular spaces between the socket and the opposed portions of the liner and of the stud.

It is also to be noted that the end opening 23 through the cushion element 12 is smaller than the end opening 24 through the other cushion element 11, so that although there is equal total compression or load of the radial flanges of said elements, yet, because there is a greater area of the element 11 taking the load than there is of the element 12, the per unit area loading of the latter element is greater than that of the former element. This loading differential, together with the radial spreading or flow of the annular flange portion of the element 11 into the enlarged tapered portion of the bore, results in a greater aggregate loading of the cushioning means against that portion of the stud head that is closest the stud shank than there is at that portion of the stud that is axially farthest from said shank. Therefore, there is less loading and resistance against tilt of the stud at the vicinity of said axially outermost portion of the head than there is at a point axially inwardly of said stud head. This differential to tilt resistance tends to hold the stud in its intended centered position relatively to the socket axis and to prevent lateral shift of the stud to either side of its centered position.

The lower end of the cushioning element 12 may be slightly chamfered as at 22 at its lower outer corner to help the flow of the rubber material and to prevent undue binding on the stud shank through forcing too much rubber into the accommodating space. Further, the lower corner bounding the hole 23 may be chamfered too, to aid in the flow of the rubber in the described direction during compression and insuring that although the rubber element will engage between the socket and the stud shank, it will merely prevent leakage therepast and prevent entry of foreign matter into the socket, and yet not be so tightly wedged into place as to appreciably increase the torque required to rotate the stud.

Any air entrapped in the joint prior to assembly will be squeezed out when compressing the cushioning means at assembly, escaping through the aligned openings through the top liner element and the cooperating cushioning element.

Having thus described my invention, it is obvious that various immaterial modifications may be made in the same without departing from the spirit of the invention; hence I do not wish to be understood as limiting myself to the exact form, arrangement, construction and combination herein described, except as limited by the claims hereunto appended.

What I claim as new and desire to secure by Letters Patent is:

1. A joint of the kind described comprising a housing having an opening transversely therethrough to form a socket, a closure member across one end of said socket, a stud rotatable and tiltable relatively to said housing and having a radially enlarged substantially cylindrical head within said socket and provided with a shank projecting axially outwardly through the other end of said socket, a resiliently compressible cushion between the peripheral bounding wall of said opening and the peripheral wall of said stud head and extending radially inwardly between said closure and an end face of said head and spaced from the latter, and a liner of a lower frictional characteristic than said cushion and inserted between said peripheral and end faces of said head and cushion and spacing the cushion and said stud head apart and rotatably engaging the peripheral and end faces of said stud head.

2. A joint as set forth in claim 1, further characterized in that said stud head is substantially cylindrical with substantially flat end faces, and that said liner engages the top and the bottom end faces of said stud head as well as engaging the peripheral bounding surface of said head.

3. A joint as set forth in claim 1, further characterized in that said stud head is provided with a lubricant reservoir opening thereinto from its end that is farthest from said shank and which reservoir is provided with openings for discharging lubricant radially outwardly through said head to communicate between said stud head and said liner.

4. A joint of the kind described comprising a housing having a transverse opening therethrough to form a socket, a stud rotatable and tiltable relatively to said socket and having a radially enlarged substantially cylindrical head within the latter and provided with a shank projecting axially outwardly through said socket, a liner having substantially anti-friction surfaces rotatably engaging both of the ends and the peripheral bounding surface of said head, and a resiliently compressible cushion between said liner and the bounding wall of said socket and having a sleeve portion receiving said shank to form a seal thereagainst.

5. A joint comprising a housing having a bore transversely therethrough, a stud rotatable and tiltable relatively to said housing and having a radially enlarged head within said bore and a shank projecting axially outwardly through said bore, a liner of relatively low frictional characteristic rotatably receiving said head, and a resilient cushion between said liner and the peripheral bounding surface of said bore and having a portion under greater compression load than its other portions, to thereby be less readily compressible at said first-mentioned loaded portion than at said other portions during stud tilt.

6. A joint comprising a housing having a transverse bore therethrough, a stud rotatable and tiltable relatively to said housing and having a radially enlarged cylindrical head within said bore and a shank projecting axially outwardly through said bore, a liner having a relatively low frictional characteristic rotatably enclosing said head, and a resilient cushion between said liner and bore and having its portion that is closest said shank under greater compression load than are its portions that are axially farthest from said shank, whereby said first-mentioned loaded portion of said cushion resists stud tilt more strongly than other portions of said cushion.

7. A joint as set forth in claim 6, further characterized in that said bore is enlargingly radially flared toward that end that is axially farthest from said stud shank, and that said cushion is axially compressed and flowed into said flared portion of the bore and is under smaller load thereat than it is at said portion that is closest said shank.

8. A joint comprising a housing having a transverse bore therethrough to form a socket, a stud having a radially enlarged cylindrical head rotatable and tiltable within said socket and having its shank projecting outwardly through one end of said socket and spaced from the wall of the bore at said end, a liner of relatively low frictional characteristic rotatably receiving the ends and the peripheral bounding surfaces of said head, and a pair of opposed resiliently compressible tubular cushions held compressed between said liner and the peripheral bounding wall of said socket and of a higher frictional characteristic than said liner, the ends of the tubular side walls of said cushions being opposed and beveled across substantially their full thickness so the opposed ends of said side walls have complementally mating beveled edges slidably interengaging one another to nest relatively of one another to form a seal between the stud and said peripheral bounding wall of said socket when the cushions are pressed together.

9. A joint as set forth in claim 8, further characterized in that said cushions are substantially cup-shaped and their annular side walls are of substantially the same radial thickness and one of said cushions has a larger opening through its end wall than the corresponding opening through the end wall of the other cushion, said cushions being held compressed axially in said socket so that the axial compression of said pair of cushions flows the bottom wall of one of them to substantially fill the space between the stud shank and the bore wall adjacent thereto to form a seal therebetween.

References Cited in the file of this patent
UNITED STATES PATENTS

| | | |
|---|---|---|
| 1,912,269 | Funk | May 30, 1933 |
| 1,985,781 | Hufferd et al. | Dec. 25, 1934 |
| 2,004,712 | Thiry | June 11, 1935 |
| 2,088,798 | Leighton | Aug. 3, 1937 |
| 2,283,440 | Hufferd | May 19, 1942 |
| 2,361,025 | Graham | Oct. 24, 1944 |